United States Patent Office 3,573,065
Patented Mar. 30, 1971

3,573,065
FREEZABLE CAKE FROSTING
Walter Arnesen, 2708 Chinquapin Oak Lane,
Arlington, Tex. 76010
No Drawing. Filed Jan. 31, 1969, Ser. No. 795,732
Int. Cl. A23g 3/00
U.S. Cl. 99—139                    2 Claims

ABSTRACT OF THE DISCLOSURE

A freezable cake frosting that can be frozen, thawed and refrozen without noticeable change in smoothness and texture and without affecting its use as a cake frosting containing in combination with whipped whipping cream as a source of fat for freezability, mixed butter and solid vegetable shortening, sugar, any of the customary flavoring ingredients, glycerine to impart freezability to the frosting so that the frosting can be thawed and refrozen repeatedly without apparent change and to aid in dissolving some of the sugar.

---

The cake frosting of this invention is very stable to freezing and thawing and thus a supply can be kept in the home freezer and the required amount for the frosting of one or more cakes can be dipped out, much in the same manner as ice cream is dipped from a container, thawed and then used in frosting the cake or cakes.

The frosting of this invention is not overly sweet nor sugary, will remain frozen for indefinite periods of time such as several months without ill effect and the frosting when thawed and applied to the cake does not bleed into the cake as is common with many other frostings. There is no collection of moisture when a frosted cake is frozen and then thawed for serving.

The freezable cake frosting of this invention consists essentially of about 8 parts of whipped whipping cream as a source of fat for freezability, about 7–13 total parts of butter and solid vegetable shortening, about 16 parts of sugar and about 1 part of glycerine together with the customary amounts of the usual flavors or flavoring ingredients such as ¼ part of liquid vanilla. In preparing the frosting the butter and shortening which are preferably in the proportions of about 4–5 parts of butter and 3–8 parts of solid vegetable shortening are blended together, then blended with the sugar which is preferably powdered sugar, then blended with the glycerine and the flavors or flavoring ingredients and finally blended with the whipped whipping cream to a smooth satiny texture. The glycerine which is used in this formula in an amount of about 1 part aids in dissolving the sugar, aids in imparting freezability to the frosting and aids in preventing the frosting from bleeding into the cake. All of the parts herein are by weight.

In one example of preparing a frosting according to this invention approximately 2 pounds of cake frosting was prepared for freezing consisting essentially of 4 ounces of pure butter, 8 ounces of solid vegetable shortening which was a solid hydrogenated vegetable oil such as "Crisco," 16 ounces of powdered sugar, 8 ounces of whipped whipping cream, 1 ounce of pure glycerine and ¼ ounce of vanilla extract.

In preparing the frosting the butter and vegetable shortening were blended together to a smooth mixture and then the powdered sugar was added and blended into a smooth mixture. The liquid glycerine was then added to the sugar, butter and shortening, then the vanilla and, finally, the whipped whipping cream and all were blended together to a homogeneous smooth mixture. The resulting frosting when frozen was stored for various periods of time and when thawed retained its original smoothness and satiny character usable for frosting cakes. When applied to cakes it had the appearance of freshly prepared frosting and had the additional advantage of not bleeding into the cake. Furthermore, the frosting could be refrozen and thawed without apparent change in texture or flavor.

Any of the usual flavorings may be used. Thus, an excellent one is mixed maraschino cherry pieces and juice.

I claim:

1. A freezable cake frosting capable of being frozen, thawed and refrozen prior to application to the cake without niticeable change in smoothness and texture, consisting essentially of: about 8 parts of whipped whipping cream as a source of fat for freezability; about 7 to 13 total parts of butter and solid vegetable shortening; about 16 parts of sugar; flavors; and about 1 part of glycerine to aid in dissolving the sugar, to impart freezability to the frosting and to prevent frosting bleeding into the cake, all said parts being by weight; said frosting having been prepared by blending together said butter and shortening to a smooth mixture, adding said sugar and blending into a smooth mixture, adding said glycerine to the sugar, butter and shortening mixture, adding said flavor and finally said whipped whipping cream and blending all together to a homogeneous smooth mixture.

2. The frosting of claim 1 wherein said butter and shortening mixture consists essentially of about 4–5 parts of butter and 3–8 parts of solid vegetable shortening.

References Cited

Lord: Everybody's Cookbook, Harcourt Brace & Co., New York, 1937, pp. 433, 438, 441, 570, 571.

Givens: Modern Encyclopedia of Cooking, vol. I, J. G. Ferguson and Associates, Chicago, 1949, pp. 606, 607, 617.

Nichols: Freezing & Canning Cookbook, Doubleday & Co., Inc., Garden City, N.Y., 1963, pp. 103, 104 and 106.

RAYMOND N. JONES, Primary Examiner

J. M. HUNTER, Assistant Examiner